J. LEBOVICI.
POWER TRANSMITTING APPARATUS.
APPLICATION FILED SEPT. 13, 1917.

1,329,780.

Patented Feb. 3, 1920.
4 SHEETS—SHEET 2.

INVENTOR
Justin Lebovici
BY
Edwards, Sager & Richmond
ATTORNEYS

J. LEBOVICI.
POWER TRANSMITTING APPARATUS.
APPLICATION FILED SEPT. 13, 1917.

1,329,780.

Patented Feb. 3, 1920.
4 SHEETS—SHEET 3.

INVENTOR
Justin Lebovici
BY
Edwards, Sager & Richmond
ATTORNEYS

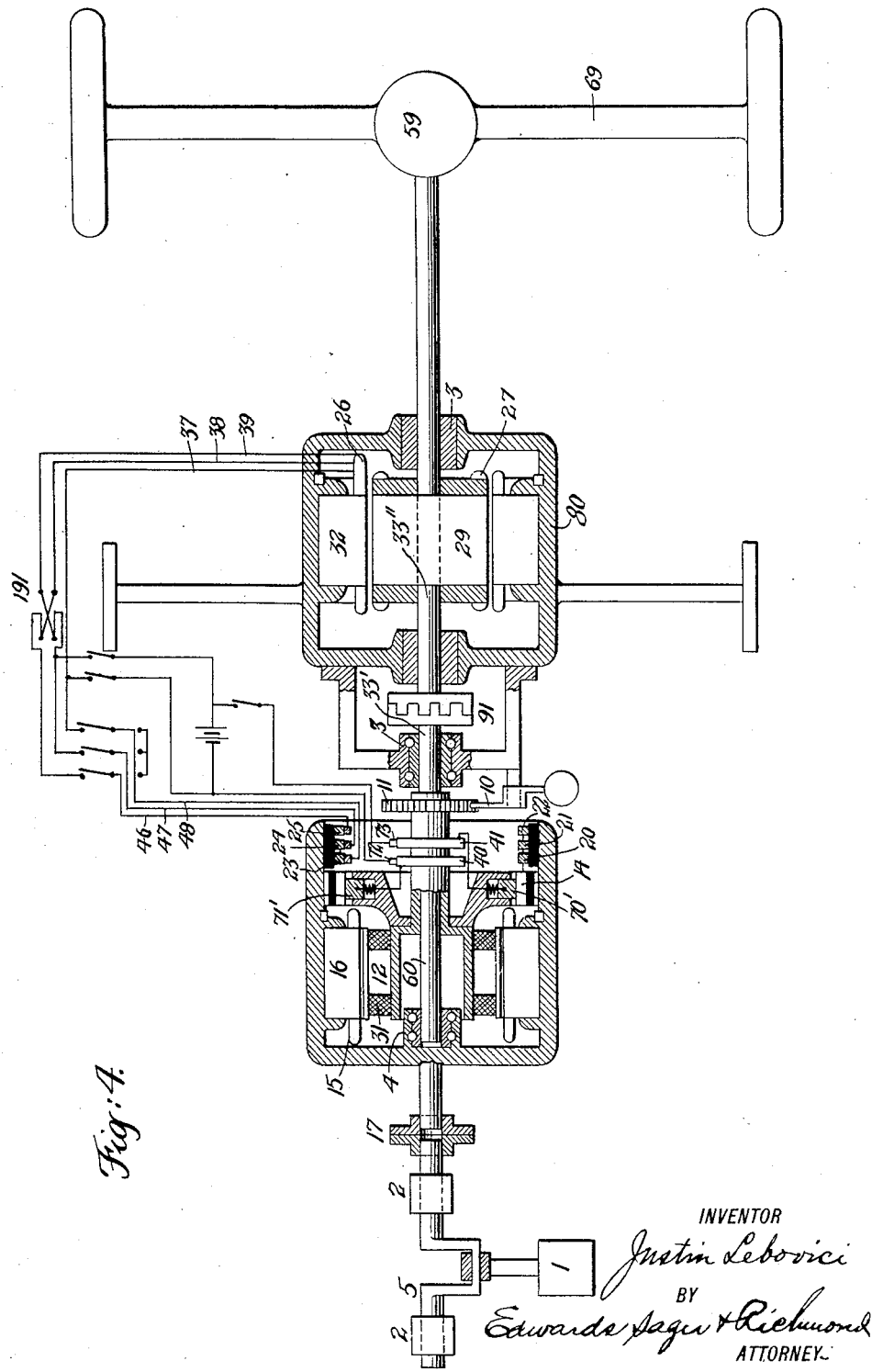

UNITED STATES PATENT OFFICE.

JUSTIN LEBOVICI, OF OAKLEY, OHIO, ASSIGNOR TO THE TRIUMPH ELECTRIC COMPANY, A CORPORATION OF OHIO.

POWER-TRANSMITTING APPARATUS.

1,329,780.     Specification of Letters Patent.     Patented Feb. 3, 1920.

Application filed September 13, 1917. Serial No. 191,107.

*To all whom it may concern:*

Be it known that I, JUSTIN LEBOVICI, a citizen of Roumania, residing at Oakley, in the county of Hamilton and State of Ohio, have invented certain new and useful Improvements in Power-Transmitting Apparatus, of which the following is a specification.

The principal object of my invention is to provide new and improved apparatus for transmitting the power of an automobile engine to the driving wheels under the varying conditions that may arise in actual use. Another object of my invention is to provide a power transmitting device comprising two interposed dynamo electric machines with an electrical connection between them, whereby alternating current generated by one of these machines is transmitted to the other machine. Another object of my invention is to provide power transmitting apparatus with electromagnetic elements and with means for adjusting the system electromagnetically so as to adapt it for various conditions of speed and torque. Another object of my invention is to provide a yielding electromagnetic connection between the prime mover and the load, whereby various speed ratios between them may be obtained and whereby flexibility of operation and adaptation to varying conditions of use may be attained. These and other objects of my invention will become more readily apparent in connection with the accompanying specification and drawings, in which I have illustrated a limited number of specific embodiments of my invention. It will be understood that modification can be made departing from the disclosure herein that will fall within the scope of my invention, and that in the following disclosure relating to the accompanying drawings I have reference to particular examples of embodiments of the invention.

Referring to the drawings,

Figs. 2, 3 and 4 are diagrams showing respective modifications.

Figure 1:
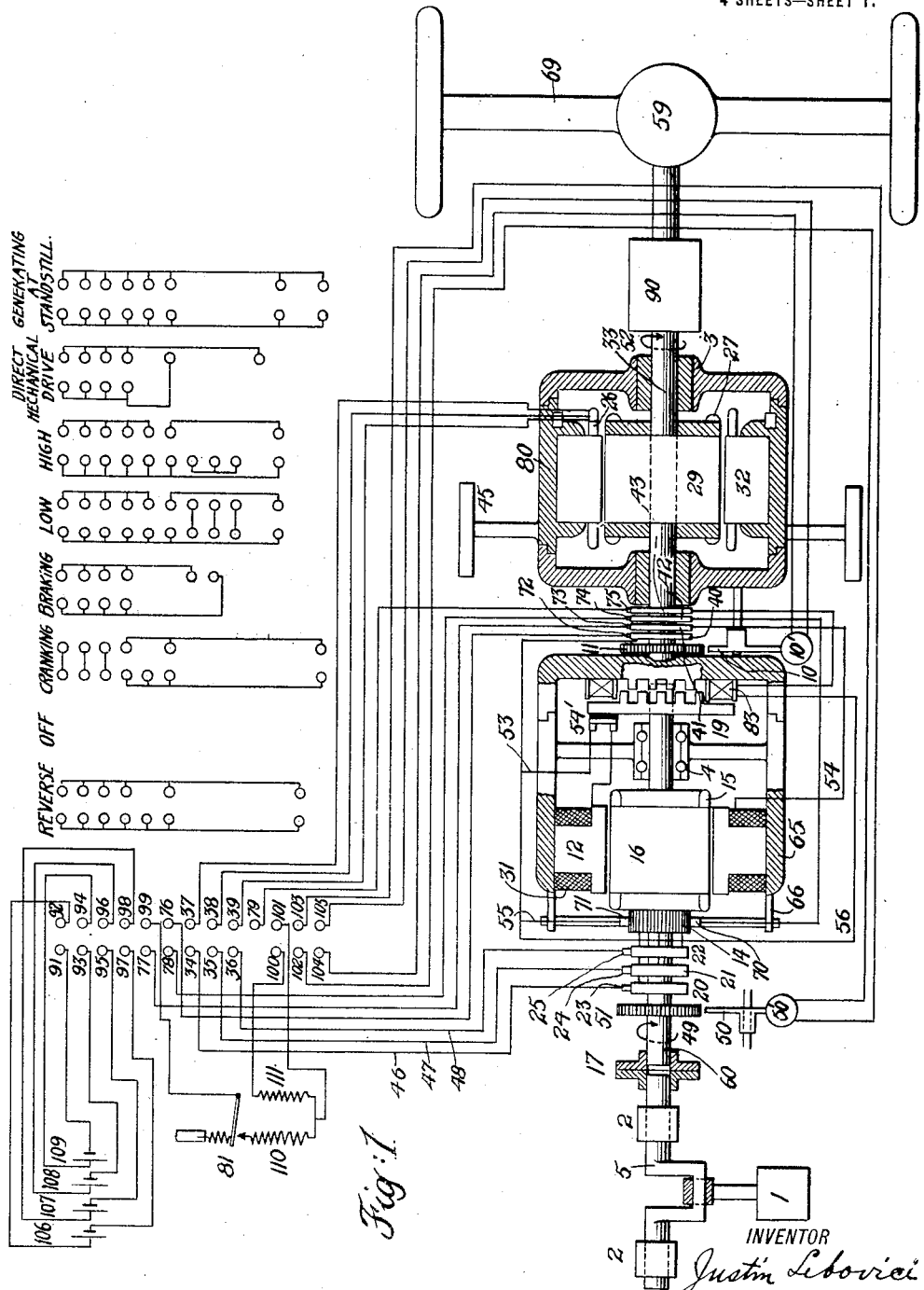
Figure 1 is a diagram of an automobile power generating and transmitting system showing one form in which my invention may be utilized.

Referring particularly to Fig. 1, the gasolene engine 1 is connected to drive the crank shaft 5 in the bearings 2. Connected with the crank shaft through a flanged coupling 17 is another shaft 60 which carries the laminated rotor 16 with the winding 15 thereon.

The fixed support 45 carries a frame 80 with journal bearings 3 for a shaft 33 in alinement with the shafts 5 and 60. At its end the shaft 33 carries a rotatable frame 65 with field magnet cores 12 and windings 31 thereon, these parts constituting another rotor in concentric and electromagnetic relation to the rotor 16—15. The frame 65 has a journal bearing 4 for the shaft 60 by which the alinement of the shafts 33 and 60 is maintained, and a clutch 19 controlled by a magnet 83 is provided by which these two shafts 33 and 60 may be coupled together. The frame 65 also carries supports 66 in which are mounted the brushes 70 and 71 in engagement with the commutator 14 associated with the winding 15. The shaft 60 carries three slip rings 20, 21 and 22 with respective three-phase taps to the winding 15. The fixed brushes 23, 24 and 25 make engagement with the respective slip rings 20, 21 and 22 and from these brushes the three conductors 46, 47 and 48 extend to the respective controller contacts 34, 35 and 36.

The shaft 60 carries a ratchet 51 which may be engaged by the pawl 50 so as to prevent rotation of the shaft 60 in the normal direction shown by the arrow 49. The pawl 50 is normally out of engagement with the ratchet 51, and is brought into engagement electromagnetically for backing the automobile, as will be explained later. Also, the rotation of the shaft 33 may be prevented by locking the pawl 10 into the ratchet wheel 11, but normally these elements 10 and 11 are out of engagement with each other, permitting the shaft 33 to rotate normally in the direction indicated by the arrow 52.

The frame 80 carries stator laminations 32 on which are the windings 26 connected to the contacts 37, 38 and 39, respectively, opposite to the contacts 34, 35 and 36.

Within the stator 32—26 are rotor laminations 29 carried by the shaft 33 and with the closed circuited windings 27 thereon.

The shaft 33 has four slip rings 40, 41, 42 and 43 with the respective fixed brushes 72, 73, 74 and 75 thereon. Brushes 72 and 73 are connected to the respective controller contacts 76 and 77. A conductor 53 goes from the slip ring 40 to the windings 31 and other conductors 55 and 56 go in multiple to the brushes 71 and the magnet 83. The conductor 53 includes a switch 54' that is normally closed but connected so as to be opened by the closure of clutch 19. Connection with brush 70 is made through slip ring 42, brush 74 and controller contact 78.

The shaft 33 makes mechanical connection through a gear box 90 and differential 59 with the rear wheels on the rear axle 69.

An automatic cut out 81 is connected as shown in the diagram. Further structural details will be apparent from the diagram and the explanation of the mode of operation that follows.

Cranking.

The apparatus being assumed to be at rest the controller will be at "off" position and clutch 19 will be open. Upon moving the controller to "cranking" position, direct current will flow from the storage battery units 106, 107, 108, 109 in series as follows: 98—107—95—96—108—93—94—109—91—92—106—97, and thence by three multiple branches from 97 back to 98 as follows: (1) 97—104—10'—105—98, energizing the magnet 10' and engaging the pawl 10 with the ratchet 11 to lock the shaft 33: (2) 97—77—73—41—54—31—54'—53—40—72—76—98, which energizes the field winding 31, and (3) 97—78—74—42—70—14—15—14—71—55—40—72—76—98, which energizes the armature winding 15. Since the pawl 10 now locks the shaft 33, the frame 65 will remain stationary but the rotor 16—15 will turn as the armature of a shunt wound direct current motor, thus turning the shaft 60 and with it the shaft 5 and driving the engine 1 until it picks up.

The armature 15—16 is wound for operation on six volts. For the cranking operation, the batteries are connected in series and deliver 24 volts. Hence, after the engine picks up, it would be necessary for it to run at an extremely high speed before the armature 15—16 would deliver a voltage at the brushes 70, 71 higher than the series battery voltage. Under normal conditions, no such high speed will be attained in cranking.

Low speed start.

A preliminary explanation of the automatic cut-out comprising the elements 110, 111 and 81, will be in order here. When the voltage across the winding 111 exceeds a certain predetermined voltage, for example, 7½ volts, the switch 81 will close, allowing the battery to be charged, but whenever the voltage across the battery rises above the voltage across the coil 111, a current in a reverse direction will flow through the series winding 110, thus opening switch 81. It is plain that the automatic cut-out effectively prevents reverse current flowing from the battery to the motor when inserted in the circuit between the battery and the brushes 70, 71.

After cranking, to start on low speed, the controller is moved to the corresponding position, thus connecting the storage battery units in multiple to the contacts 97 and 98. The battery is now on open circuit tracing the conductor from the contact 98 and 99 to the automatic cut-out 81. The circuit of the winding 15 is closed across the brushes as follows: 15—14—70—42—74—78—100—111—101—76—72—40—55—71—14—15. Thus, the current delivered from the winding 15 to the brushes 70 and 71 energizes the cutout coil 111. A shunt circuit also energizes the field winding 31, the complete circuit being traced as follows: 15—14—70—42—74—78—77—73—41—54—31—54'—53—55—71—14—15. Three-phase alternating current also flows from the winding 15 to the three slip rings 20, 21 and 22, and thence by brushes 23, 24 and 25, contacts 34, 35 and 36, thence to the contacts 37, 38 and 39 to the winding 26. The electromagnetic reaction between the members 16—15 and 12—31 causes the rotation of the former to drag the latter with a certain degree of slip. The three-phase alternating current in the winding 26 also causes a certain drag on the rotor 29 with its closed winding 27.

The frequency per second of the current in the windings 15 being designated as C, the speed of the shaft 33 in rotations per minute will be approximately $120\,C/(p_1+p_2)$ where $p_1$ represents the number of poles on the member 12 and $p_2$ represents the number of poles on the stator 32 as determined by the character of the winding 26 thereon. It will be seen that $p_1$ and $p_2$ can readily be given such values as may be desired in the design of the apparatus, and hence any appropriate speed ratio when operating in this way can readily be obtained. Thus, full engine horsepower is transmitted to give a low speed and high torque on the driven shaft 33.

Further, to explain this, suppose that the car is stuck in a mud-hole, then the slow speed start will take place as follows: The member 12 being stationary, the difference in speed between the rotor 16 and this member 12 will be very high, the member 16 being driven at full engine speed. Heavy alternating currents will flow through the slip rings 20, 21 and 22 to the induction motor windings 26 setting up a rotating field which will act on the squirrel cage winding 27 to aid in starting the car.

As soon as the car starts and a sufficient slip is attained between the members 16 and 12, the current flowing through the coil 111 will reach a value sufficient to close the cut-out 81, whereupon the battery units 106, 107, 108, 109 will charge in multiple from the brushes 70 and 71 through the circuit traced as follows: 15—14—70—42—74—78—77 through the battery to 99—81—110—101—76—72—40—55—71—14—15.

*High speed.*

The next controller position beyond the low speed is high speed. It will be seen that the only change from low speed is to short circuit the contacts 34, 35 and 36 cutting off current from the stator winding 26. Thus, no torque will be exerted on the rotor 29, but the short circuiting of the three-phase conductors from the winding 15 at the contacts 34, 35 and 36 will cause heavy currents to flow through the winding 15 and reduce the slip between the members 12 and 16. Thus, the shaft 33 will rotate nearly as fast as the engine shaft 16.

*Direct drive with mechanical coupling.*

When the controller is moved to the corresponding position for direct mechanical drive, the circuit between the battery terminals 97 and 98 is as follows: 97—76—72—40—56—83—43—75—79—98. The current flowing from the battery in this circuit energizes the magnet 83, thus closing the clutch 19 and opening the switch 54′. The closure of the clutch 19 locks the shafts 60 and 33 together so that the engine drives the shaft 33 directly without any electromagnetic interposition. The battery is on open circuit at this time except for the circuit just traced through the clutch magnet 83.

*Charging battery at standstill.*

The controller being thrown to the battery charging position, the shaft 33 is locked by energization of magnet 10′ through the circuit 97—104—10′—105—98, and accordingly the field 12—31 is stationary and the rotor 16—15 operates as the armature of an electric generator. This generator is self-exciting through the following circuit: 15—14—70—42—74—78—77—73—41—54—31—54′—53—55—71—14—15. Another circuit from the generator goes through the shunt coil 111 as follows: 15—14—70—42—74—78—100—111—101—76—72—40—55—71—14—15. When the current flowing through the shunt coil 111 energizes it sufficiently, it closes the switch 81 and then the charging current flows from the generator through the battery and following circuit: 15—14—70—42—74—78—97 through the battery 98—99—81—110—101—76—72—40—55—71—14—15.

Should the batteries become fully charged and begin to discharge, the flux which would be set up by the coil 110, being in a counter direction to that which is set up by coil 111, would cause the cut-out to open, thus preventing further discharge of the batteries.

*Reversing.*

With the controller on the corresponding position indicated in Fig. 1, a current flows from the battery through the circuit 97—102—50′—103—98, thus energizing the magnet 50′ and locking the pawl 50 into the ratchet 51. This holds the engine shaft 60 from rotating. Current also flows from the battery through circuits easily traced through the windings 15 and 31 in shunt to each other. The member 16—15 being held stationary, the member 12—31 rotates backward, thus giving the desired reverse drive and in this case the power is obtained entirely from the battery. The gear box 90 contains mechanical reversing gearing that can be utilized for driving the car backward from the ordinary operation of the engine, if so desired.

*Braking.*

With the controller at the corresponding position shown in Fig. 1, a battery circuit is completed through part of the windings 26 as follows: 97—38—26—37—98. At this time the member 29—27 is rotating, being driven from the rear wheels through the differential 59. The energization of the windings 26 with direct current creates stationary poles in the member 32 causing a drag on the member 29 rotating within the same. Aside from electromechanical braking as described above the ordinary friction brakes may be employed.

Figure 2:
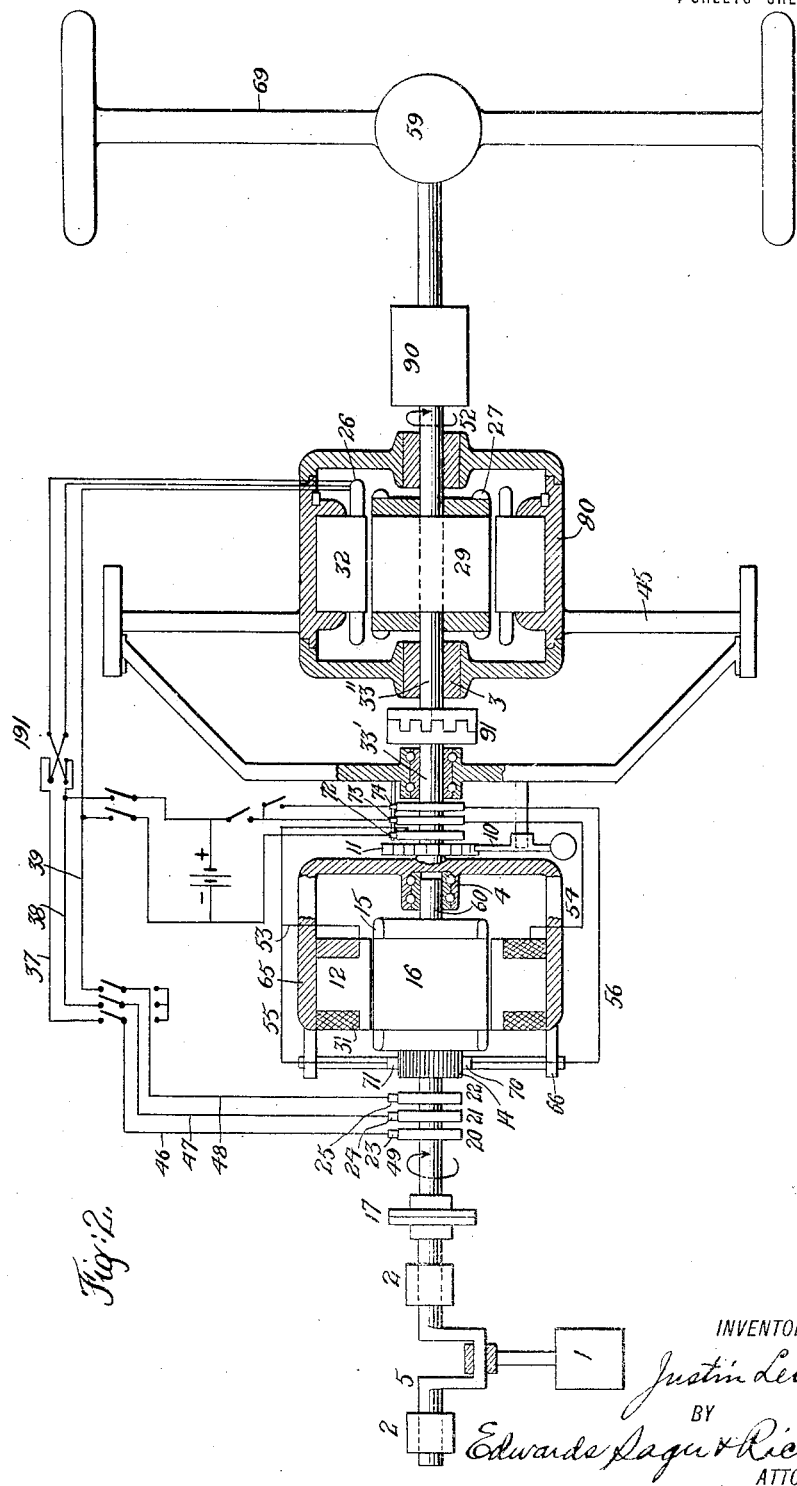
Figure 3:
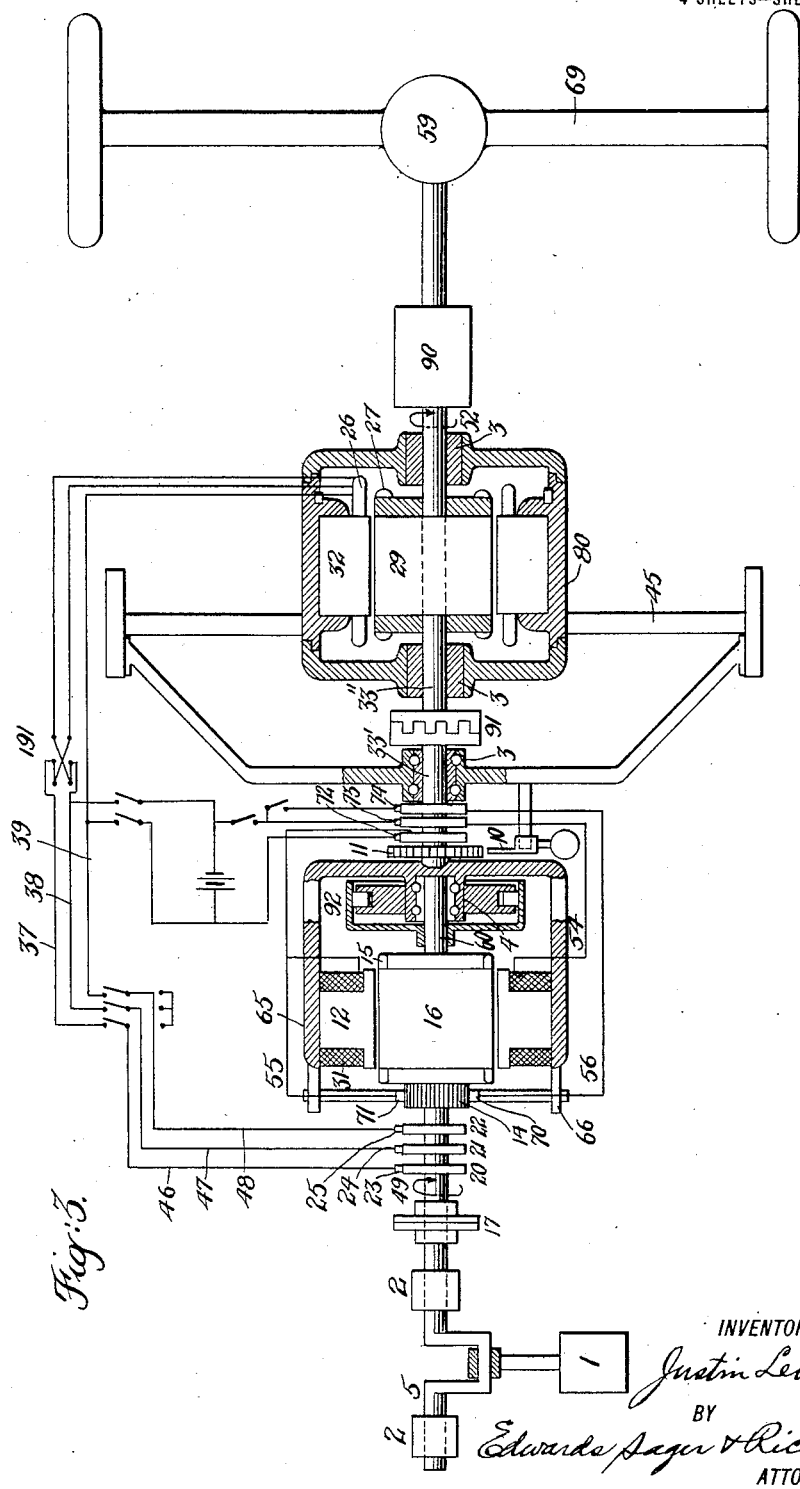

*Modifications of Figs. 2, 3 and 4.*

Structurally the system of Fig. 2 differs from that of Fig. 1 in the omission of pawl 50 and ratchet 51, omission of clutch 19, and separation of shaft 33 into two segments 33′ and 33″ with a normally closed clutch 91 between them. The circuit for the magnet controlling the pawl 10 is not shown in this diagram and separate switches have been shown instead of a single controller. Operatively, Fig. 2 differs from Fig. 1 in that electric reversal is obtained by opening clutch 91 and engaging pawl 10 with ratchet 11, whereupon the member 12—31 acts as a stator with the rotor 16—15 generating alternating current which is fed over conductors 37, 38 and 39 to stator windings 26 rotating member 29 in reverse direction as the secondary of an induction motor. A reversing switch 191 is provided to interchange the connections of two of the conductors 37, 38 and 39, so as to make the field in the stator 32—26 rotate in the reverse direction.

Structurally, Fig. 3 is the same as Fig. 2 with the addition of a centrifugal friction clutch 92 between the shaft 60 and the frame 65. In operation this gradually locks the shafts 60 and 33' together at higher speeds on direct drive.

Fig. 4 differs from Fig. 2 in that the member 16 is here external instead of internal, and the member 12 is internal instead of external. The brushes 70' and 71' are massive and engaging the concave commutator 14 perform the function of the centrifugal clutch 92 of Fig. 3.

In the following claims I employ the term "dynamo" as broad enough to apply to either a generator or a motor, and I use the term "windings" in a broad sense to cover the conductors of such a machine, including for example, the conductors of a squirrel cage.

Having thus described my invention, I declare that what I claim as new and desire to secure by Letters Patent is:—

1. In a power transmitting device, a prime mover, a first dynamo member mechanically connected therewith, a second dynamo member in electromagnetic relation with the first, a load and a third dynamo member mechanically connected with the second, a fourth dynamo member fixed and in electromagnetic relation with the third, a commutator and brushes carried by the first and second members, alternating current taps also connected with the same member as said commutator, a plurality of storage battery units adapted for series or multiple connection, means to connect said units in series to said brushes and the member carrying the brushes for cranking and in multiple for charging, and a winding on one of said third and fourth members adapted to be connected with said taps.

2. In a power transmitting device, a prime mover, a first dynamo member mechanically connected therewith, a second dynamo member in electromagnetic relation with the first, a load and a third dynamo member mechanically connected with the second, a fourth dynamo member fixed and in electromagnetic relation with the third, a commutator and brushes carried by the first and second members, alternating current taps also connected with the same member as said commutator, a plurality of storage battery units adapted for series or multiple connection, means to connect said units in series with said brushes and the member carrying the brushes, and means simultaneously to lock said second and third members against rotation.

3. In a power transmitting device, a prime mover, a first dynamo member mechanically connected therewith, a second dynamo member in electromagnetic relation with the first, a load and a third dynamo member mechanically connected with the second, a fourth dynamo member fixed and in electromagnetic relation with the third, a commutator and brushes carried by the first and second members, alternating current taps also connected with the same member as said commutator, storage battery cells adapted for multiple or series connection with said brushes and the member carrying the brushes, means to conduct alternating current from said taps to the dynamo comprising the third and fourth members to operate said dynamo as a motor, an automatic cut-out to control the connection of said brushes with said storage battery, and means to determine a multiple connection of the cells at the same time.

JUSTIN LEBOVICI.